United States Patent [19]

Nickols

[11] Patent Number: 4,808,354

[45] Date of Patent: Feb. 28, 1989

[54] METHOD OF MAKING ELECTRICAL DISCHARGE MACHINING ELECTRODES

[75] Inventor: Richard C. Nickols, East Hartford, Conn.

[73] Assignee: International Fuel Cells Corporation, South Windsor, Conn.

[21] Appl. No.: 64,358

[22] Filed: Jun. 22, 1987

[51] Int. Cl.$^4$ .................. B29C 43/02; B29C 45/00; B29L 31/34

[52] U.S. Cl. .................... 264/29.5; 264/83; 264/105; 264/319; 264/328.1; 264/83; 264/331.11

[58] Field of Search ............ 264/29.5, 105, 319, 264/328.1, 83, 331.11

[56] References Cited

U.S. PATENT DOCUMENTS

| | | | |
|---|---|---|---|
| 1,556,990 | 10/1925 | Henry . | |
| 2,066,176 | 12/1936 | Girvin et al. | 171/325 |
| 2,582,764 | 1/1952 | Bailey | 18/54.7 |
| 2,653,878 | 9/1953 | Sejersted | 106/56 |
| 2,764,539 | 9/1956 | Horvitz | 204/67 |
| 3,084,394 | 4/1963 | Bickerdike et al. | 264/105 |
| 3,112,208 | 11/1963 | Johnson | 106/56 |
| 3,187,089 | 6/1965 | Cosby | 174/94 |
| 3,219,731 | 11/1965 | Etzel et al. | 264/105 |
| 3,413,152 | 11/1968 | Folkins et al. | 264/105 |
| 3,442,715 | 5/1969 | Yee et al. | 264/105 |
| 3,856,574 | 12/1974 | Amaji et al. | 264/105 |
| 4,308,177 | 12/1981 | Tucker | 252/507 |
| 4,320,185 | 3/1982 | Bernstein et al. | 264/105 |
| 4,350,652 | 9/1982 | Theysahn et al. | 264/105 |
| 4,360,485 | 11/1982 | Emanuelson | 264/29 |
| 4,541,985 | 9/1985 | Devillard | 419/10 |

*Primary Examiner*—Hubert Lorin
*Attorney, Agent, or Firm*—Harry J. Gwinnell; John W. Hogan, Jr.

[57] ABSTRACT

A method for fabricating electrical discharge machining electrodes includes forming a thin electrode shell by compression molding a mixture of carbon particles and an organic binder. The electrode shell is then thermally processed to graphitize the organic binder and carbon producing an electrode with the structural integrity needed so as to be useful in electrical discharge machining.

6 Claims, 1 Drawing Sheet

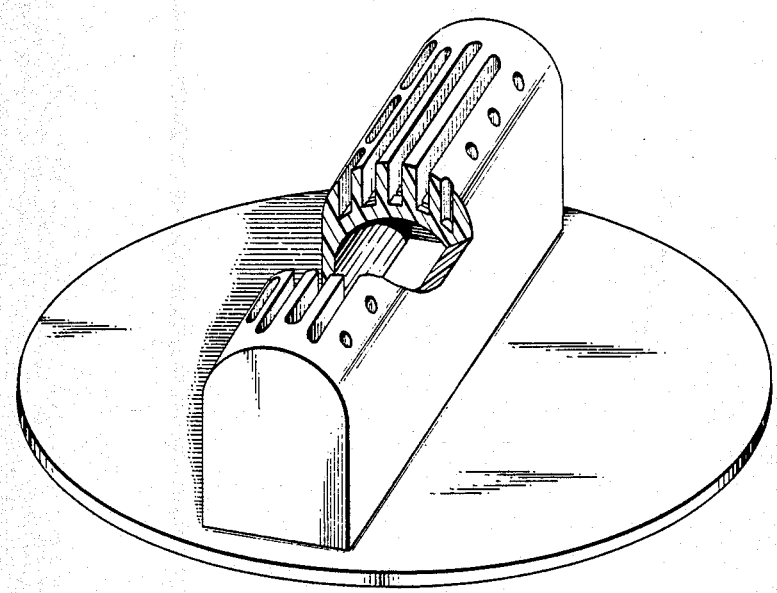
FIG. 1
FIG. 2
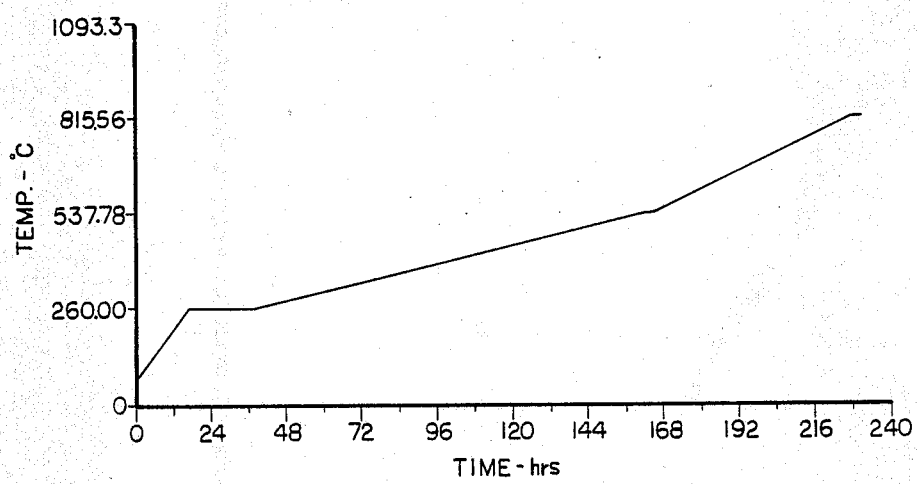

METHOD OF MAKING ELECTRICAL DISCHARGE MACHINING ELECTRODES

Description

1. Technical Field

This invention relates to electrical discharge machining electrodes, in particular, to carbon or graphite electrical discharge machining electrodes.

2. Background Art

Electrical discharge machining (EDM) is a method for producing holes, slots or complex cavities in electrically conductive material by means of the controlled removal of material through melting or vaporization by high frequency electrical sparks. The spark discharge is produced by the controlled pulsing of direct current between the workpiece and an electrode.

EDM electrodes are commonly made from metals (e.g., copper, brass, zinc and tungsten) or metalloids (e.g., carbon and graphite). The only mandatory property for the EDM electrode material is that it must be electrically conductive, but naturally the material's resistance to wear is also an important consideration.

Presently, EDM electrodes are made by conventional machining or powder metallurgy techniques and these techniques have been used successfully for individual electrodes. However, such techniques are time consuming and inherently expensive. The metal electrodes of the prior art have typically been made by powder metallurgy. There has really never been an effective method of making carbon electrodes for EDM. For example, carbon electrodes are typically machined one at a time which can be a process that takes several working days.

Accordingly, there remains a need for an inexpensive method to produce large numbers of EDM electrodes.

DISCLOSURE OF INVENTION

In this invention, a method is acheived for fabricating electrical discharge machining electrodes which includes forming a thin electrode shell by molding a mixture of carbon particles and an organic binder. The walls of the electrode shell are thin enough to allow gas to escape during the subsequent thermal processing without deformation of the electrode shell. The electrode shell is then thermally processed to convert the organic binder into carbon, producing an all carbon electrode useful in electrical discharge machining. The product produced from such a process is also disclosed.

Other features and advantages will be apparent from the specification and claims and from the accompanying drawings.

BRIEF DESCRIPTION OF THE DRAWINGS

FIG. 1 is a diagrammatic representation of an electrical discharge machining electrode made by the present invention.

FIG. 2 shows a graph of a typical carbonization cycle.

BEST MODE FOR CARRYING OUT THE INVENTION

The starting form of carbon filler used in the molding process is graphite particles, e.g., as is commercially available from Airco Carbon Company as Airco-60. When packing the graphite into the mold, it is desirable to minimize void formation during processing to ensure structural integrity. Utilizing a range of particle sizes results in less void formation. The smaller mean particle sizes do not pack as well as the larger mean particle sizes. While mixtures of particles having sizes from one micron to 20 microns can be used, they should preferably have a mean particle size range of from about 10 microns to about 12 microns. Although the molding orocess can be used with any electrically conductive material, carbon is preferred. Materials (such as metal) nonreactive to the extent of impairing conductivity may also be used in this process.

The binder can be any resinous material convertible with heat to carbon, but the resins should be selected to minimize shrinkage. Any resins which give over 40 percent carbon yield can be used, but carbon resins which will give over a 50 percent carbon yield after carbonization are preferred. Examples of polymers which could be used are coal tar pitches, polyvinyl chloride, phenol-formaldehyde, epoxidized phenol-formaldehyde, polyfurfuryl alcohol, polyvinyl alcohol or polyacrylonitrile. Thermosetting materials are preferred and particularly phenolic materials which are commercially available from Plastics Engineering Company. Thermosetting materials are preferred because the mold does not have to be cooled in order to remove the article from the mold. With thermoplastic materials, such cooling would have to be effected.

It is desirable to pack as much graphite filler as possible into the electrode shell mold and still be able to mold. The more graphite you have, the less shrinkage you have also. Some electrodes have been made starting with as little graphite filler as 50 percent by weight (percentage by weight is percentage of total weight of carbon and binder), but because of the 7 percent to 9 percent volume shrinkage in the resulting electrode, higher percentages of graphite filler are usually preferred. Typically, the graphite filler represents about 70 percent by weight to 90 percent by weight of the starting mixture. It is preferred to use on the order of 80 percent by weight to 85 percent by weight graphite filler (typically resulting in less than 2 percent volume shrinkage).

The resin and carbon particles should be selected to provide the most graphitic structure with the best structural integrity. Various conventional additives can also be combined with the resin and the carbon such as processing aids to improve molding, improve crosslinking, reduce the time of processing or make the material more graphitic (especially in the binder phase). Organic solvents may be added to help in the blending. The binder and carbon particles should be homogeneously blended for uniform shrinkage.

Conventional, commercially used compression molds or injection molds can be used to make the electrode shell. Regarding time, temperature and pressure used in the compression molding process, these parameters should be selected (i.e., long enough, hot enough and high enough, respectively) so as to produce enough structural integrity for the electrode to withstand thermal processing. Typical molding conditions are 3 to 5 minutes at temperatures of 300° F. (148.89° C.)–500° F. (260° C.) (about 350° F. (176.67° C.) for phenolic resins) at pressures of 5000 psi to 10,000 psi.

Thermal processing is used to convert the binder to carbon (see FIG. 2) and subsequently to graphite. Maximum graohitization is the goal. While it may be possible to practice the invention with a merely carbonized electrode, a unitary graphite electrode i preferred. By "unitary" graphite electrode it is meant an electrode which is a material made up of carbon predominantly in graphite form, but in which some of the carbon may not have been converted to graphite. Typically, the amount of carbon remaining after the graphitization cycle varies according to the amount of resin used (more resin results in less graphite), but the carbon remaining is in a more ordered, less amorphous form. It is preferred to have 80 percent by weight or more graphite in the resulting electrode. Conventional carbonization processing is used, with the temperature schedules being dependent on the particular resin chosen. For example, the carbonization cycle starts at room temperature and the temperature is elevated to between 1500° F. (815.56° C.) and 2000° F. (1093.33° C.) in a nonoxidizing environment (nitrogen or argon are typical). Gas is lierated in large amounts at first and then slowly at the end of the cycle. At the end of the cycle the temperature is elevated more quickly to retain the carbon and liberate the remaining hydrogen. Optimum heat cycles are chosen, i.e., sufficiently slow to maintain structural integrity in the shortest time period possible, with maximum carbon yield (the relatively thin walls especially helpful with regard to the speed).

Conventional graphitizing furnaces can be used for the graphitization process. In such furnaces, the temperature is elevated from room temperature up to 2500° C. (4532° F.) as quickly as the furnace permits, since the higher temperatures appear to cause graphitization relatively independently of time.

The shape of the electrode, of course, will be based on the particular utility of the electrode, i.e., the configuration of the part to be made. Ideally, a "throw away" electrode for machining is the goal. Structural integrity is the key with the thinness of the wall an aid to the shortened processing time to allow the gas which is liberated during the carbonizing cycle to be removed from the walls. Wall thicknesses typically range between 0.05 inch to 0.3 inch. Typical densities of the final electrode are from 1.6 grams per cubic centimeter to 1.8 grams per cubic centimeter. The conductivity of the article is typically $0.01 \times 10^2$ ohm centimeters up to $0.09 \times 10^2$ ohm centimeters.

EXAMPLE

In one example of the invention, the following approach was used to demonstrate the making of an electrode. A mixture was made of a phenolic resin Type 1436 commercially available from Plastics Engineering Company and Airco-60 graphite powder available from Airco Carbon Company (mean particle size of 10 microns to 12 microns). The mixture contained 20 percent by weight of the phenolic resin and 80 percent by weight of the graphite powder. The graphite and resin were mechanically blended to make a homogeneous moldable compound. The moldable compound was compression molded in a mold obtained from Plastics Engineering Company. The mold was heated to a temperature sufficiently high to set the resin and give the part structural integrity, approximately 350° F. (176.67° C.). The mold was heated for about three to five minutes at 5000 psi –10,000 psi. The resultant shell was carbonized, see FIG. 2, by gradually heating the electrode shell outside the mold starting at 150° F. (65.56° C.) and going to 500° F. (260° C.) in a time of 17.5 hours. It was then kept at 500° F. (260° C.) for 20 hours. After the 20 hours, the electrode was heated gradually from 500° F. (260° C.) to 1000° F. (537.78° C.) in 125 hours. It was then held at 1000° F. (537.78° C.) for 2 hours. At that point, the shell was heated from 1000° F. (537.78° C.) to 1510° F (821.11° C.) in a time of 63 hours. It was then held at 1510° F. (821.11° C.) for a period of 1 hour. The electrode was then graphitized by heating it to 2500° C. (4532° F.) as quickly as possible for about 4–6 hours.

The resulting article, see FIG. 1, had the structual integrity, density and electrical conductivity required to make an electrode useful for EDM. All of the walls between the slots, cavities and troughs are quite thin (each less than 0.1 inch). Additionally, as is shown, the article is hollow so that the distance from the inner wall to the outer wall is also small (again less than 0.1 inch).

This thin wall design allows gas evolution during the thermal processing stage while maintaining structural integrity. Otherwise, the resulting article could deform and fracture due to entraoment of gases in thick cross sections or could be porous and require reimpregnation with a media to close the porosity. This design is also important because if the thermal processing is too slow, it is not commercially feasible; but if the process is too fast, the structural integrity of the part is adversely affected because cracks may develop inthe electrode during the thermal processing. The hollow nature of the electrode may have an additional advantage, when using the EDM electrode, in that, the dielectric fluid used to flush away the metal from the workpiece may be introduced through the hollowed out area.

The resulting EDM electrodes can be used for any of the traditional uses for EDM electrodes. In fact, additional nontraditional uses may also be found for the electrodes because of the significant reduction in the cost of producing large numbers of identically shaped EDM electrodes. For example, precision machining of turbine airfoil blades may now be feasible.

Overall, the present invention has several benefits. There are savings in both labor and time, and therefore, a monetary savings because of the reduced cost of production. Additionally, there may be an increase in the utility of the electrode with increased use of the EDM art into nontraditional fields.

It should be understood that the invention is not limited to the particular embodiments shown and described herein, but that various changes and modifications may be made without departing from the spirit and scope of this novel concept as defined by the following claims.

I claim:

1. A method of making an electrical discharge machining electrode comprising:
   (a) forming an electrode shell having walls by molding with minimized void formation a mixture of carbon particles in which the carbon particles range in size from about 1 micron to about 20 microns, with a mean particle size from about 10 microns to about 12 microns, and an organic binder into a shell having all said walls with a thickness of about 0.05 inch to 0.3 inch which is thin enough to allow gas to escape from all of said walls during the thermal processing of step b without deforming the shell;
   (b) thermally processing said shell to convert the carbon-organic binder mixture into a unitary graphite electrical discharge machining electrode.

2. A method as in claim 1 in which the organic binder is a phenolic resin.

3. A method as in claim 1 in which the amount of carbon particles is from about 50 percent by weight to about 90 percent by weight.

4. A method as claimed in claim 1 in which the electrode shell is formed by compression molding.

5. A method as claimed in claim 1 in which the electrode shell is formed by injection molding.

6. A method as claimed in claim 1 in which the electrode shell is thermally processed in a nonoxidizing environment by heating to carbonize followed by heating to graphitize.

* * * * *